Figure 1:
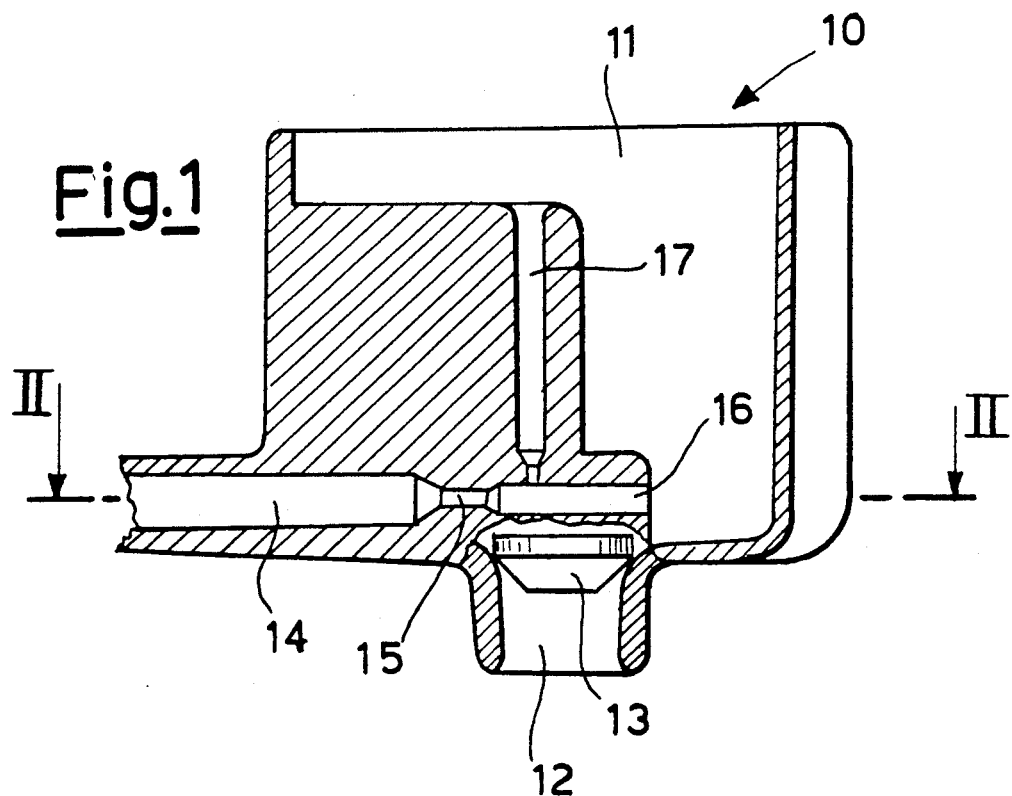

United States Patent [19]

Di Girolamo

[11] Patent Number: 5,052,289
[45] Date of Patent: Oct. 1, 1991

[54] EMULSIFYING DEVICE FOR LIQUIDS, IN PARTICULAR MILK

[76] Inventor: Silvestro Di Girolamo, Viale Lucania, 13, 20139 Milan, Italy

[21] Appl. No.: 605,405

[22] Filed: Oct. 30, 1990

[30] Foreign Application Priority Data

Nov. 10, 1989 [IT] Italy ............................... 22078/89[U]

[51] Int. Cl.$^5$ ............................................... A01J 11/00
[52] U.S. Cl. ........................................ 99/452; 99/275; 99/323.1; 261/DIG. 7
[58] Field of Search .................................. 99/452–454, 99/275, 323.1; 261/DIG. 7

[56] References Cited

U.S. PATENT DOCUMENTS 4,715,274 12/1987 Paoletti ................................. 99/452
4,922,810 5/1990 Siccardi ................................ 99/453
4,949,631 8/1990 Fregnan ................................ 99/453

Primary Examiner—Harvey C. Hornsby
Assistant Examiner—Randall Chin
Attorney, Agent, or Firm—Charles A. Brown

[57] ABSTRACT

An emulsifying device (10) for liquids, in particular milk, comprises a container (11) containing the liquid to be emulsified and to which is connected near the bottom a first horizontal duct (14) connected to a steam source. The first duct (14) has a constriction (15) downstream from which is connected a second duct (17) with an opening at the top flowing into said container (11) in a position near the level of its edge so as to draw in air and emulsified liquid reaching the upper opening level as the steam passes into the first duct (14). Container (11) comprises a drain (12) with a closing plug (13) removable to take away the emulsified liquid.

5 Claims, 1 Drawing Sheet

EMULSIFYING DEVICE FOR LIQUIDS, IN PARTICULAR MILK

The present invention relates to a device employed for emulsifying and heating milk with steam.

In the known art there are devices for emulsifying and heating milk, e.g. for preparing the coffee beverage known as 'cappuccino', consisting of an element with a steam emitting spout to be immersed in the milk placed in a receptacle to perform diffusion of steam in the liquid mass of the milk with simultaneous suction and recirculation using the Venturi effect caused by passage of the steam, air and foam of the milk part already emulsified to improve the emulsion and simultaneously heat it. In said device The quality of the result is dependent on the skill of the operator, who immerses the spout of the device more or less deeply in the milk, withdrawing it and immersing it rhythmically until complete emulsion of the liquid is achieved. If not correctly performed, these operations, in addition to not giving the desired results, can also result in dangerous projections of milk and/or hot steam.

Emulsifying and heating devices have been proposed comprising an incorporated milk container intended to eliminate the need for special skill on the part of the operator. In said devices, because of their peculiar construction, the phase of air and foam recirculation, which is decisive for fast, homogeneous emulsion and heating of the liquid, is lacking.

The object of the present invention is to overcome the above shortcomings while providing an emulsifying and heating device for liquids, in Particular milk, which would not require skill on the part of the operator and would provide optimal recirculation of the part of the liquid already emulsified to secure heating and complete emulsification thereof in a uniform manner.

In view of said object there has been conceived an emulsifying device for liquids, in particular milk, comprising a container, containing the liquid to be emulsified and to which is connected near the bottom a first horizontal duct connected to a steam source and characterized in that the first duct, virtually horizontal, has a constriction downstream from which is connected a second duct with an opening at the top flowing into said container in a position near the level of its edge so as to draw in air and emulsified liquid reaching the upper opening level as the steam passes into the first duct.

To further clarify the explanation of the innovative principles of the present invention and its advantages compared with the known art there is described below with the aid of the annexed drawings a possible embodiment as an example applying said principles.

Figure 2:
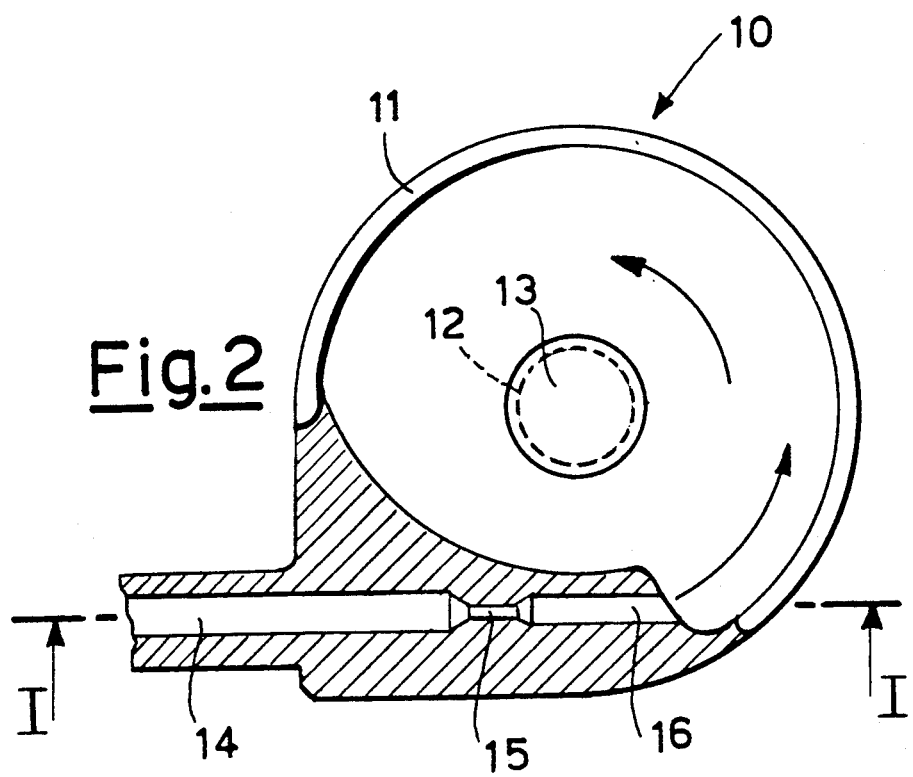

In the drawings,

FIG. 1 shows a schematic cross section view along plane of cut I—I of FIG. 2 of an emulsifying device in accordance with the invention, and FIG. 2 shows a plan view partially sectioned along plane of cut II—II of FIG. 1.

With reference to the figures an emulsifying device indicated generally by reference number 10 in accordance with the invention comprises a container 11 having a drain 12 with a closing plug 13 as shown in section plane in FIG. 1.

The device also comprises a duct 14 for inlet of steam arriving from a boiler of the known art and therefore not shown, e.g. belonging to a coffee-making machine of the espresso type. The duct 14 has a constriction 15 and then continues with an outlet part 16 again enlarged and flowing into the container 11 near its bottom. A vertical duct 17 has its lower end connected to the part 16 and the upper end also flowing internally to the container 11 near the level of its upper edge.

As may be seen in FIG. 2 the container has advantageously internal walls generally shaped to form in plan view a scroll and the duct 16 emerges in a direction virtually tangential to the wall of the container.

In use there is placed in the container 11 the quantity of milk it is desired to emulsify, taking care that the top thereof is below the top end of the duct 17.

Steam is then let into the duct 14. After passing the constriction 15 the steam expands in the duct 16 and begins to condense while in the meantime it sucks in air due to the Venturi effect from the duct 17. The milk begins to emulsify thanks to the outlet of heated air from the duct 16 which is injected in the form of small bubbles into the liquid.

Under the pressure of the steam and air issuing from the duct 16 the liquid, thanks to the scroll form of the container and the tangential position relative to the duct 16, assumes a spiral rotary circulating movement which quickens the emulsifying process and makes it uniform.

Input of steam continuing, the emulsified part of the milk reaches the top end of the duct 17 and then is sucked in with the air to be discharged again from the duct 16. Rapid heating of the emulsion is thus obtained up to the desired temperature, at which steam inlet may be stopped and the contents of the container 11 can be taken for use through the opening of the duct 12, removing the plug 13 which for this purpose may have for example an upper intake extension coming out of the container (not shown because easy to imagine by those skilled in the art).

It is to be understood that the above-described embodiment is simply illustrative of the principles of the invention. Various other modifications and changes may be made by those skilled in the art which will embody the principles of the invention and fall within the spirit and scope thereof.

For example, although the ducts are shown as embodied to advantage in a single piece with the body of the container, e.g. by press-forging, they can of course be provided as separate parts inserted in said container.

I claim:

1. Emulsifying device for liquids, in particular milk, of the type comprising a container and containing the liquid to be emulsified and to which is connected near the bottom a first duct connected to a steam source and characterized in that the first duct, which is virtually horizontal, has a constriction downstream from which is connected a second duct with an opening at the top flowing into said container in a position near the level of its edge so as to draw in air and emulsified liquid reaching the upper opening level as the steam passes into the first duct.

2. Device in accordance with claim 1 characterized in that the first duct is positioned with outlet into the container in a direction virtually tangential to the cylindrical wall of said container.

3. Device in accordance with claim 2 characterized in that the container has a bottom with a scroll form initiating at the point of outlet of the first duct therein.

4. Device in accordance with claim 1 characterized in that the container has a bottom drain with controlled opening means.

5. Device in accordance with claim 1 characterized in that said container and said first and second ducts are made in a single piece.

* * * * *